May 14, 1963 R. W. PARKER ETAL 3,089,169
SWEEPER WITH SIDE DUMPING DEBRIS BASKET
Filed May 4, 1959 4 Sheets-Sheet 1

INVENTORS
Richard H. Parker
Warren Houser
Theophilus P. R. Stout
BY
Schmieding & Jully
ATTORNEYS

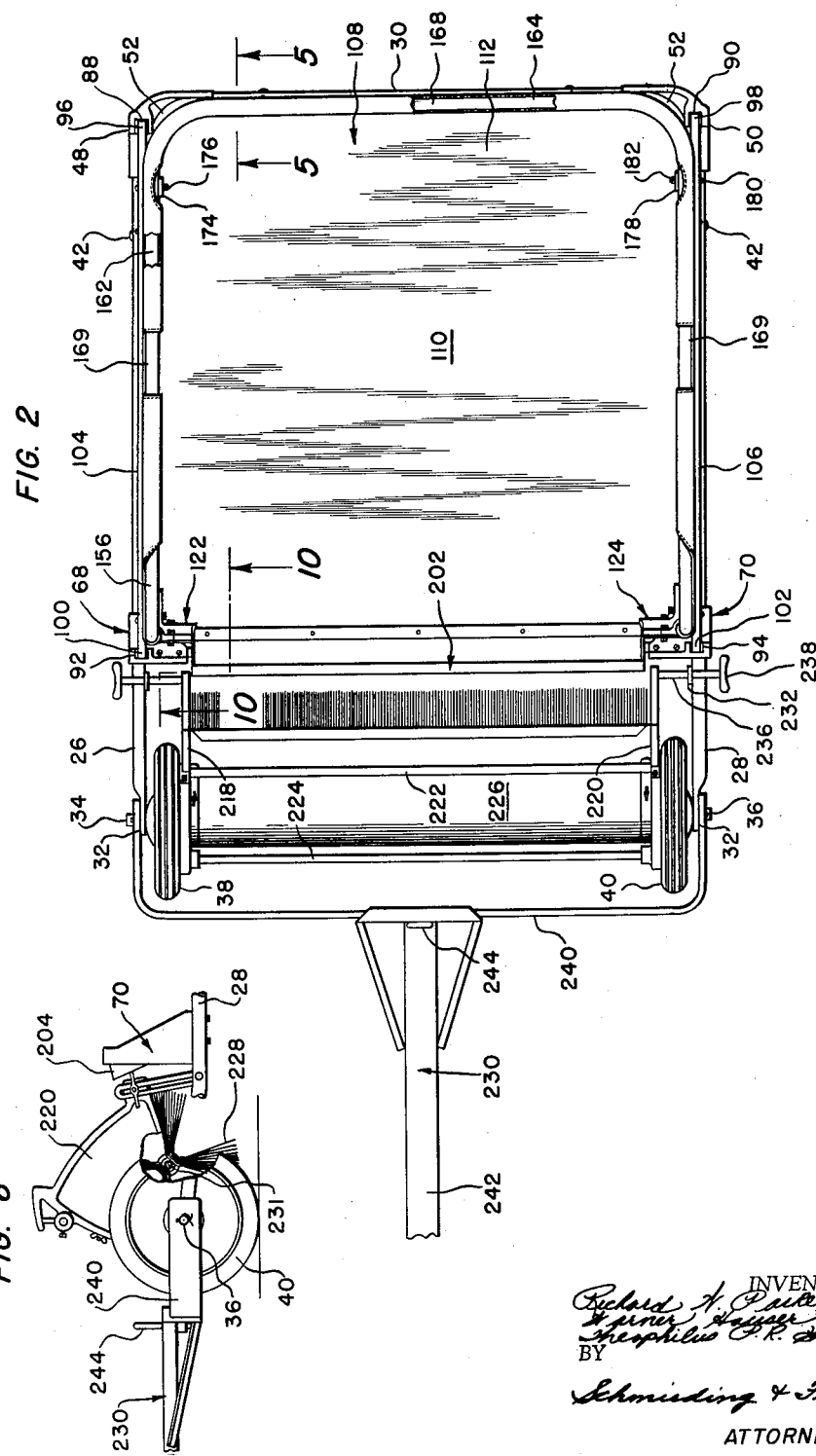

May 14, 1963 R. W. PARKER ETAL 3,089,169
SWEEPER WITH SIDE DUMPING DEBRIS BASKET
Filed May 4, 1959 4 Sheets-Sheet 3
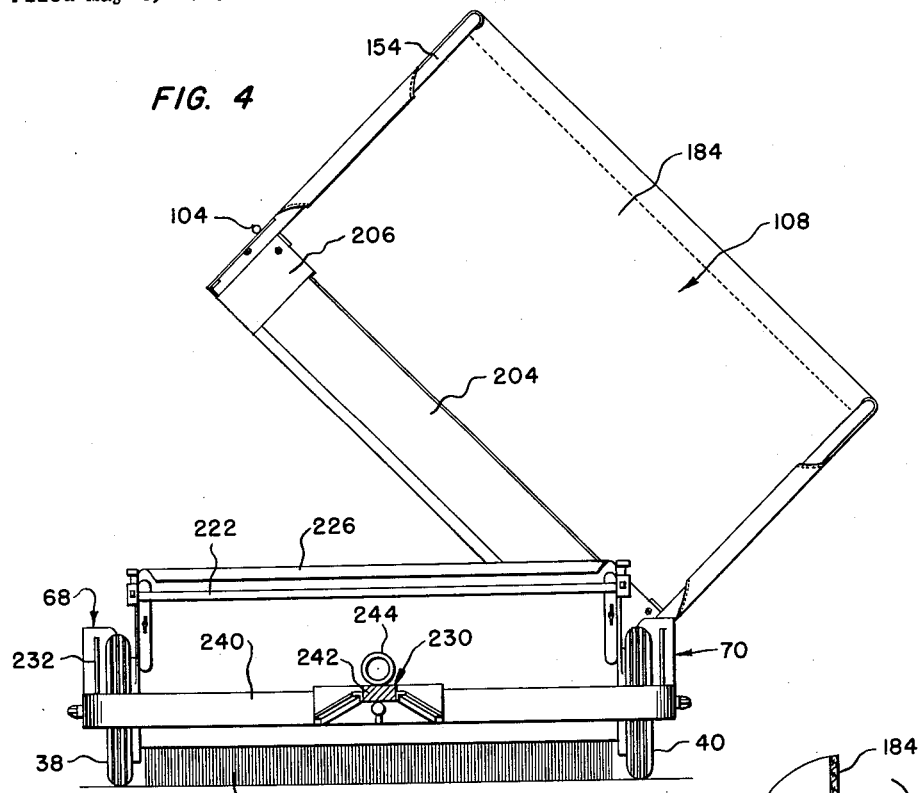
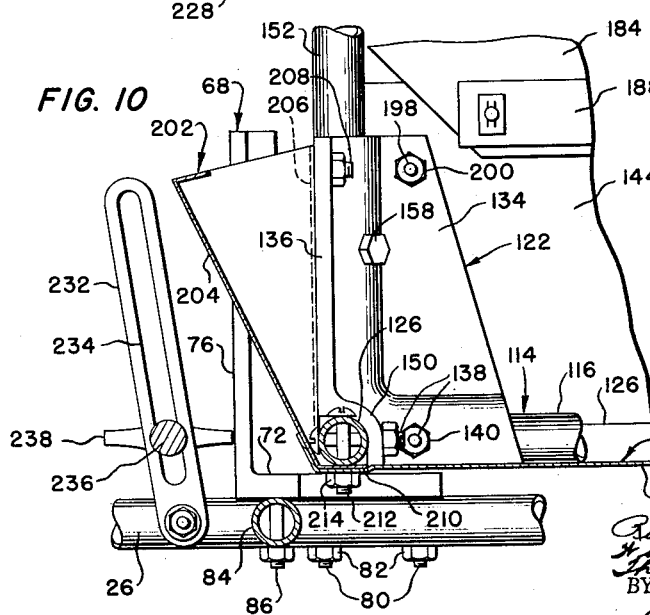
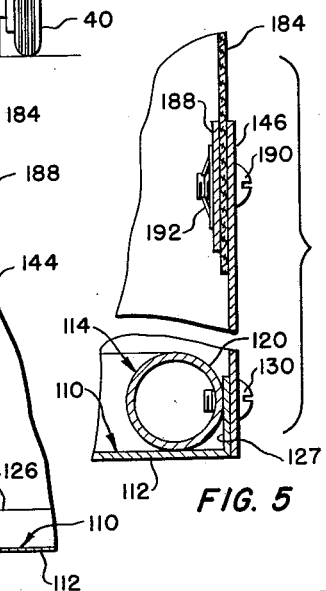
INVENTORS
Richard W. Parker
Warner Hauser
Theophilus P.P. Stout
BY
Schmieding & Fultz
ATTORNEYS

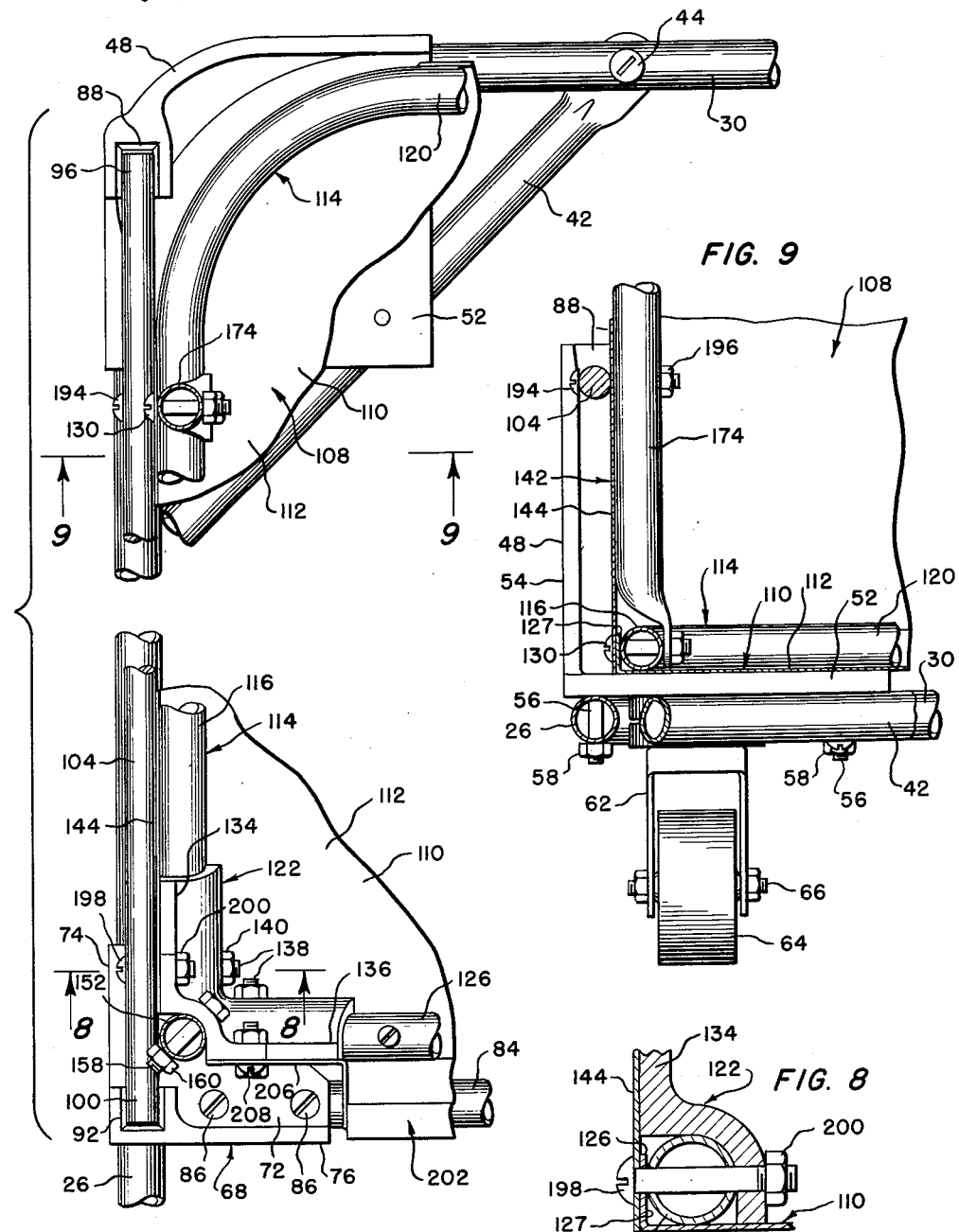

United States Patent Office 3,089,169
Patented May 14, 1963

3,089,169
SWEEPER WITH SIDE DUMPING DEBRIS BASKET
Richard W. Parker and Warner Houser, Springfield, and Theophilus P. R. Stout, North Hampton, Ohio, assignors to Parker Sweeper Company, Springfield, Ohio, a corporation of Ohio
Filed May 4, 1959, Ser. No. 810,623
3 Claims. (Cl. 15—83)

The present invention relates to sweepers and more particularly to sweepers of the type which have an open top debris receptacle. While not limited thereto, the present invention is employed usually for sweeping lawns.

In practicing the present invention, there is provided a cart including a frame having front and rear wheels. This cart carries a sweeper head, preferably at the front of the cart; a rotatable brush is carried by the head and a hood is also carried by the head; when the head is carried by the front of the sweeper, the hood is so disposed as to direct the debris, leaving the head, rearwardly. A debris receptacle is also carried by the cart, preferably rearwardly of the head, and is disposed so that it receives the debris which is picked up, due to rotation of the brush, and which is directed rearwardly by the hood. The debris receptacle is pivotally mounted on the cart so that it can be moved to debris dumping position. While not limited thereto, the pivotal connection between the debris receptacle is such that the receptacle is movable laterally and preferably laterally to either side of the cart.

More specifically, the cart is provided with two pairs of bearings, each pair including a forwardly disposed bearing and a rearwardly disposed bearing, and, the debris receptacle includes two pairs of bearings supported by the bearings on the cart, one pair being disposed at one side of the receptacle and the other on the other side of the receptacle. The bearings on either the cart or receptacle are of the open socket type so that they may be disengaged from the respective cooperating bearings by merely lifting the debris receptacle, i.e., the debris receptacle can be tilted sidewise in either direction by merely lifting one side thereof.

Further objects and advantages will be apparent from the following description, reference being had to the accompanying drawings wherein a preferred embodiment of the invention is illustrated.

In the drawings:

FIG. 2 is a top plan view of the sweeper;

FIG. 4 is a view similar to FIG. 3 but showing the debris receptacle being moved toward the dumping position to the right side of the sweeper;

FIG. 5 is a fragmentary sectional view taken along line 5—5 of FIG. 2 but on a larger scale;

FIG. 6 is a fragmentary view of the front end of the sweeper but showing part of the frame broken away to show the brush;

FIG. 7 is a fragmentary view taken along line 7—7 of FIG. 3 but on a somewhat larger scale, parts thereof being foreshortened;

FIG. 8 is a fragmentary sectional view taken along line 8—8 of FIG. 7;

FIG. 9 is a fragmentary sectional view taken along line 9—9 of FIG. 7; and

FIG. 10 is a fragmentary sectional view taken on line 10—10 of FIG. 2 but on a larger scale.

Figure 1:
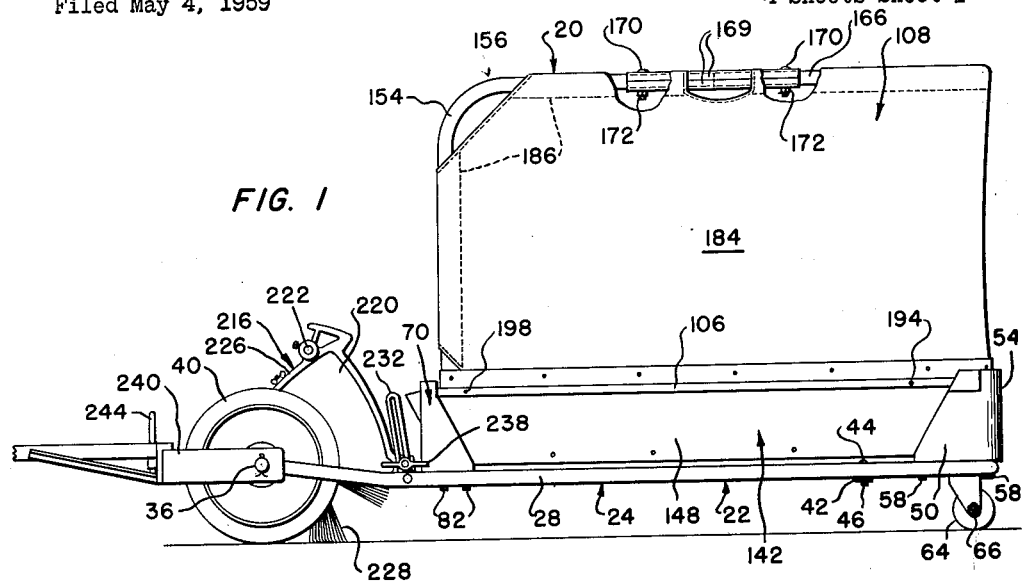
FIG. 1 is an elevational view of the right side of the improved sweeper.
Figure 3:
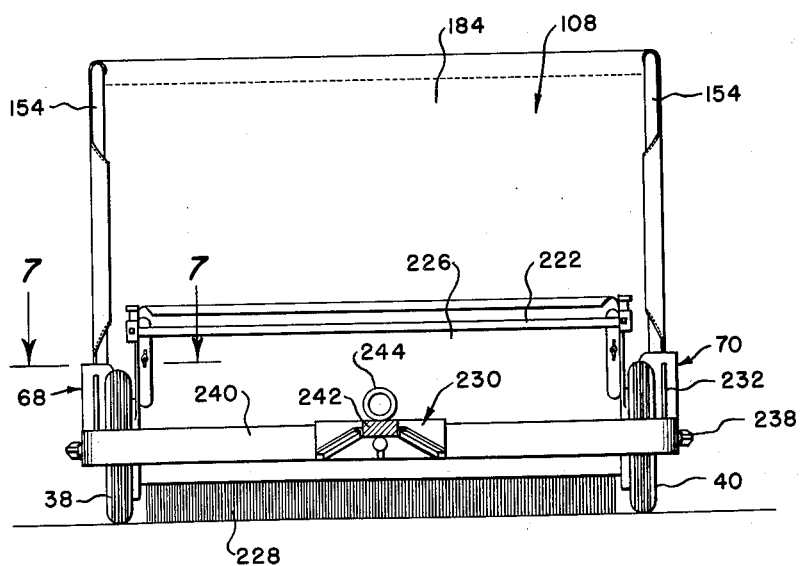
FIG. 3 is a front view of the sweeper.

Referring more in detail to the drawings the sweeper 20 comprises a cart 22. The cart 22 includes a generally U-shaped frame 24 formed of tubing, the frame including a left leg 26, a right leg 28 and a connecting or rear section 30. The front ends of the legs 26 and 28 are flattened as at 32 and then drilled for receiving axles 34 and 36. These axles are supported by wheels 38 and 40. A brace 42 is connected to the leg 26 and the yoke 30 by bolts 44 and nuts 46. A similar brace 42 is connected between leg 28 and yoke 30.

Rear corner supports 48 and 50 are carried at the left and right rear corners of the frame, respectively. Each of these supports includes a base 52 and a curved upright wall 54 which extends over the rear of a side leg and an end of a yoke of the tubular frame 24. Each of these supports is held in place by two bolts, one extending through a side leg and the other through the yoke. This is more clearly shown in FIG. 9 wherein the bolt is shown at 56 which extends through the leg 26 and is held in place by the nut 58. The base 52 of each of these supports 50 carries a swivelled fork 62 which in turn carries wheels or rollers 64 by axles 66.

Front supports 68 and 70 are carried by the legs 26 and 28 respectively. The left support 68 is clearly shown in FIG. 7. It includes a base 72, a side wall 74 and a front wall 76. The base 72 is fastened to the leg 26 of the tubular frame 24 by bolts which pass through the leg 26. These bolts are shown at 80 in FIG. 10 and are held in place by nuts 82. A brace in the form of a tube 84 is secured to the under side of the front supports 68 and 70 by bolts 86. The front support 70 is held in place on the leg 28 in the same manner as was explained with respect to supports 68 being carried by leg 26, and the brace 84 is secured by bolts to the underside of support 70. The brace 84 in cooperation with the supports 68 and 70 forms a rigid front for the forward part of the cart 22.

As is more clearly shown in FIG. 7, the rear support 48 is recessed near the upper portion thereof to provide an open front and open top socket 88. A similar socket 90 is formed in the support 50. The front support 68 is also provided with a socket 92 which is open at the top and open at the rear. A similar socket 94 is provided in the front support 70. These sockets 88, 90, 92 and 94 provide bearings for cylindrical bearings 96, 98, 100 and 102. These latter bearings are in the form of trunnions, trunnions 96 and 100 being in the form of a rod 104, while trunnions 98 and 102 are in the form of a rod 106. These rods are parts of the debris receptacle 108.

The debris receptacle comprises a base 110 which includes a bottom wall or floor 112, a U-shaped tubular frame 114 including a left leg 116, a similar right leg (not shown) and a rear yoke 120, the base including a left bracket frame 122 and a right bracket frame 124, and the base also including a connecting brace in the form of a tube 126 connecting the bracket frames 122 and 124. The bottom wall is provided with upturned flanges at all four edges thereof. One of these flanges is shown at 127 in FIG. 5. These flanges are bolted or otherwise secured to the U-shaped frame 114 by bolts or screws 130. The bracket frame 122 includes two legs, 134, which extends rearwardly, and 136 which extends from the left or right. These legs are arcuately shaped, as is more clearly shown in FIG. 8 and partly surround the leg 116 of the U-shaped frame 114 and the brace 126, and are fastened to the leg 116 and the brace 126 by the bolts 138 and nuts 140. The bracket 124 is fastened to the leg 118 and to the brace 126 in the same manner as brace 122 is connected to leg 116 and brace 126.

A U-shaped panel 142, including left side 144, rear 146 and right side 148, surrounds the flange 127 of the bottom 112 by the bolts or screws 130, the flanges 127 being interposed between the U-shaped frame 114 and the panel, as is more clearly shown in FIG. 9.

The front brackets 122 and 124 include uprights 150 which are arcuate in shape and receive the upright legs 152 of a front basket frame section 154. These basket frame sections are L-shaped, the upper horizontal runs of which are shown at 156. The upright legs 152 are secured to the bracket uprights 150 by bolts 158 and nuts 160. The basket frame 168 includes a rear section which is C-shaped including a left leg 162, a rear yoke 164 and a right leg 166. This rear section is indicated generally at 168. The rear ends of legs 156 of the front basket frame 154 abut the front ends of the forwardly extending legs 162 and 164 of the C-shaped rear basket frame 168. Each set of legs 156 and 162 or 164 are fastened to one another by two half-round pieces of metal 169 which are bolted to the said legs by bolts 170 and nuts 172 (see FIG. 1). A vertical brace 174 is bolted to the leg 116 of the U-shaped frame 114 and bolted to the leg 162 by bolts 176, and likewise a vertical brace 178 is bolted to the leg 118 and to the leg 166 of the basket frame section 168 by bolts 180 and nuts 182. The braces 174 and 178 are formed of tubing which are provided with flattened sections at the ends, the bolts passing through the flattened sections.

The basket frame sections 154 and 168 carry a U-shaped canvas 184 to provide a basket which is open at the front, the two sides and the rear being closed. As is more clearly shown in FIG. 1, the front, top and the rear are provided with hems 186 for receiving the legs of the basket frame. The lower portion of the U-shaped canvas is fastened by clamping the same between the panel 142 and a U-shaped strip 188. Screws 190 and nuts 192 are provided for this purpose, the screws passing through the canvas.

The rods 104 and 106 are fastened to the debris receptacle by bolts 194 and nuts 196 which are secured to the uprights 174 and 178, and by bolts 198 and nuts 200 which are secured to the brackets 122 and 124. These rods resting, respectively, in the bearings 88 and 92 and 90 and 94 permit the debris receptacle to be tilted either to the right or to the left. When tilted to the right the rod 104 will be withdrawn from the socket bearings 88 and 92, and, will pivot in bearings 90 and 94, and, when tilted to the left, the rod 106 will be withdrawn from the socket bearings 90 and 94 and will be tilted in the socket bearings 88 and 92. Thus it is apparent that the basket can be moved to dumping positions either to the right or to the left.

Referring particularly to FIG. 10, it will be seen that the front of the basket or debris receptacle is provided with a forwardly extending basket extension 202, the front wall 204 of which extends upwardly and forwardly from the bottom 112. It is provided with side flanges 206 shown in dotted lines in FIG. 10 and in full lines in FIG. 7. These flanges are secured to the basket brackets 122 and 124 by screws 208. The lowermost portion of the extension 202 is disposed horizontally as at 210 and is interposed between the brace 126 and the bottom and is held in place by a series of bolts 212 and nuts 214. These bolts also extend through the bottom 112 and thus the bottom is held in place.

In the preferred embodiment the sweeper head is disposed at the front of the cart and is shown generally at 216. The head 216 includes left side frame 218 and right side frame 220 which are held in place by tie rods 222 and 224. A hood 226 spans the side frame 218 and 220. This hood may be of the type shown in the copending application of Edwin F. Oblinger, Serial Number 769,762, filed October 27, 1958, now Patent No. 3,022,-530, or similar to that shown in the Edwin D. Parker patent, No. 2,654,106 or the Edwin D. Parker et al. patent, No. 2,737,673. The axles 34 and 36 are carried by the side frames 218 and 220, respectively.

A brush 228 is carried by an axle 231, the axis of which is arranged parallelly of the axis of the axles 34 and 36 and is arranged rearwardly of these axles. Suitable gearing is interposed between the wheels 38 and 40 for driving the brush at a higher r.p.m. than that of the wheels. Such gearing may be of the type shown in the aforementioned patents. As the sweeper is moved forwardly, leaves are picket up by the rotation of the brush and directed upwardly and rearwardly by the hood 226 so that the leaves and debris are thrown into the debris receptacle or basket. The sweeper may be pushed by hand or may be pulled by a tractor, and for this purpose a suitable hitch 230 is provided.

The brush 228 can be adjusted to various heights. FIG. 1 shows the brush in its lowermost position, and in FIG. 6 the brush is shown close to its highest position. For this purpose two links 232 are provided, one being pivotally connected to the leg 26 of the frame 22 and the other being pivotally connected to the leg 28 of said frame. The links are slotted at 234, each being adapted to receive a bolt 236 which extends laterally from the side frames 218 and 220, and are held in adjusted position by wing nuts 238. It will be observed that the top of the bracket extension 202 lies adjacent the periphery of the brush 228 regardless of the height of the brush. In this way debris will not fall between the head and the forward end of the basket, but instead all will be caught by the basket as the debris is being flung rearwardly by the brush.

More specifically the hitch 230 includes a C-shaped frame 240 which is attached to the axles 34 and 36 and this C-shaped frame is connected to a tongue 242 by a removable pin 244. If desired several (preferably two) of these sweepers may be connected side by side and a third sweeper arranged in tandem rearwardly and intermediate the other two sweepers.

The present invention is particularly applicable to large places that have to be swept such as parks or fairways of golf courses. Obviously if the sweepers are arranged side by side, one should be dumped to the right and one should be dumped to the left, and by the present construction this dumping can be readily effected since the trunnions on one side of the sweeper can be withdrawn from their respective sockets, while the trunnions on the other side function as bearings in their respective sockets.

Since the sockets are of the open type, the entire debris receptacle can be removed completely from the cart when, for example, it is desirable to empty the receptacle at some point away from the sweeper, such as emptying the same directly into a truck.

Rotting usually takes places first at the bottom of the debris receptacle when such receptacle is formed of canvas. In the instant disclosure, the lower portion of the debris receptacle, namely the bottom wall or floor 112, the U-shaped tubular frame 114, and panel 142 are formed of metal, the bottom wall or floor and the panel 142 being formed of sheet metal and the tubular frame 114 being formed of metal tubing. Being formed of metal, these parts will not rot as canvas does. Should the canvas rot in the instant case, the old can be replaced readily by merely removing bolts 190, withdrawing the old canvas, then substituting new and then reapplying new by clamping the lower edge thereof between the panel 142 and strip 188 by the bolts 190.

Without losing cognizance of the advantage of dumping the receptacle from either side of the cart, another advantage lies in the elimination of the usually employed rearwardly and upwardly extending handle. The handle was a detriment in that it would strike low hanging branches of trees causing either, at times, the stalling of the sweeper or the breaking of the branches. In the instant disclosure, no protruding handle is necessary.

Heretofore, the upper part of the debris receptacle was contoured to follow the angularly disposed handle, namely the top of the receptacle was low in front and high in the rear. Crosswinds moving over the front end of the receptacle, striking the debris as it leaves the sweeper, caused most of the debris to be blown sidewise and by to the ground without entering the receptacle. In such cases a wind apron was necessary, covering the receptacle. Such apron, however, was a nuisance in that it had to be removed each time the receptacle was emptied and then had to be reapplied.

The problem of coping with the crosswinds has been solved by the present invention. This has been accomplished by extending the sides, at the front of the receptacle a substantial distance vertically, i.e., to a height above that of the sweeper, by disposing the front edges of the side of the receptacle close to the rear outlet of the sweeper, as is clearly shown in FIG. 1.

While the form of embodiment herein shown and described constitutes a preferred form, it is to be understood that other forms may be adopted falling within the scope of the claims that follow.

We claim:

1. A sweeper comprising in combination, a sweeper head including a frame, axle means supported on said frame, wheels on said axle, and a rotatable brush carried by the frame; a second frame pivotally connected at the forward end thereof to the axle means and extending rearwardly thereof to form a cart, wheel means swivelly attached adjacent the rear of said second frame; a debris receptacle carried on the cart in a position to receive debris from the sweeper head, the major portion of said debris receptacle disposed between the wheels on the axle and the wheel means attached to the second frame; pivotal bearing means supported on the second frame and means on the debris receptacle for mounting said debris receptacle for rotation in the bearing means to permit lateral dumping of the receptacle on either side of the cart, said bearing means preventing any lateral or longitudinal play of the receptacle with respect to the frame.

2. The sweeper as set forth in claim 1 wherein the frame is a tubular U-shaped member, the debris receptacle having a generally rectangular configuration in horizontal cross section and the pivotal bearing means comprises a socket support means mounted on the second frame and disposed at each of the corners of the debris receptacle.

3. The sweeper as set forth in claim 1 wherein the pivotal bearing means comprises a rod attached to each side of the debris receptacle and adjacent the lower edge thereof, sockets attached to the frame, each of the sockets having a pocket with side walls and a closed end, and being open at the top, the ends of the rods fitting down into the sockets to engage both the side and end walls of the pocket.

References Cited in the file of this patent

UNITED STATES PATENTS

| | | |
|---|---|---|
| 283,415 | Passmore | Aug. 21, 1883 |
| 625,669 | Gorr | May 23, 1899 |
| 683,197 | Braun | Sept. 24, 1901 |
| 879,759 | French | Feb. 18, 1908 |
| 939,765 | Walte | Nov. 9, 1909 |
| 1,507,317 | Laberge | Sept. 2, 1924 |
| 2,945,249 | Parker et al. | July 19, 1960 |